US012619413B2

(12) United States Patent
Jang et al.

(10) Patent No.: US 12,619,413 B2
(45) Date of Patent: May 5, 2026

(54) METHOD AND SYSTEM FOR INSTALLING AN APPLICATION IN A VEHICLE

(71) Applicants: HYUNDAI MOTOR COMPANY, Seoul (KR); KIA CORPORATION, Seoul (KR)

(72) Inventors: Yocheol Jang, Suwon-si (KR); HeeJin Ro, Seoul (KR); Duckyoung Kim, Seongnam-si (KR); Jongbok Lee, Yongin-si (KR); Donghee Seok, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 362 days.

(21) Appl. No.: 18/222,228

(22) Filed: Jul. 14, 2023

(65) Prior Publication Data

US 2024/0134621 A1 Apr. 25, 2024
US 2024/0231787 A9 Jul. 11, 2024

(30) Foreign Application Priority Data

Oct. 20, 2022 (KR) ........................ 10-2022-0135599

(51) Int. Cl.
*H04W 4/00* (2018.01)
*G06F 8/61* (2018.01)
*G06F 9/44* (2018.01)

(52) U.S. Cl.
CPC ...................................... *G06F 8/61* (2013.01)

(58) Field of Classification Search
CPC ..... G06F 8/60; G06F 8/61; G06F 8/65; G06F 8/453; G06F 9/3836
See application file for complete search history.

(56) References Cited

U.S. PATENT DOCUMENTS

RE42,101 E * 2/2011 Chasen ................... G06F 16/20
715/201
2013/0031459 A1* 1/2013 Khorashadi ............. G06F 16/94
715/234
2014/0109078 A1* 4/2014 Lang ........................ G06F 21/53
717/172
2015/0113520 A1* 4/2015 Kotani ...................... G06F 8/65
717/172

(Continued)

FOREIGN PATENT DOCUMENTS

KR 102288570 B1 8/2021

*Primary Examiner* — S. Sough
*Assistant Examiner* — Mohammad H Kabir
(74) *Attorney, Agent, or Firm* — Lempia Summerfield Katz LLC

(57) ABSTRACT

A method and system for installing an application in a mobility device are disclosed. The method of installing an application in a mobility device includes: securing data matched to the mobility device in a server based on application installation information included in an application installation request in response to the application installation request received from the mobility device; creating a metadata adapter of the application in the server based on the secured matching data; transmitting the created metadata adapter together with binary data of the application from the server to the mobility device; and installing the application in the mobility device using the metadata adapter transmitted from the server to the mobility device.

26 Claims, 10 Drawing Sheets

(56)　　　　　　　References Cited

U.S. PATENT DOCUMENTS

| | | | | |
|---|---|---|---|---|
| 2017/0052775 | A1* | 2/2017 | Byrnes | G06F 8/61 |
| 2019/0268722 | A1* | 8/2019 | Elswick | H04W 4/029 |
| 2020/0259655 | A1* | 8/2020 | Woo | H04W 4/44 |
| 2021/0276181 | A1* | 9/2021 | Prajapati | B25J 9/1669 |
| 2022/0357886 | A1* | 11/2022 | Pitchumani | G06F 16/13 |

* cited by examiner

FIG. 4

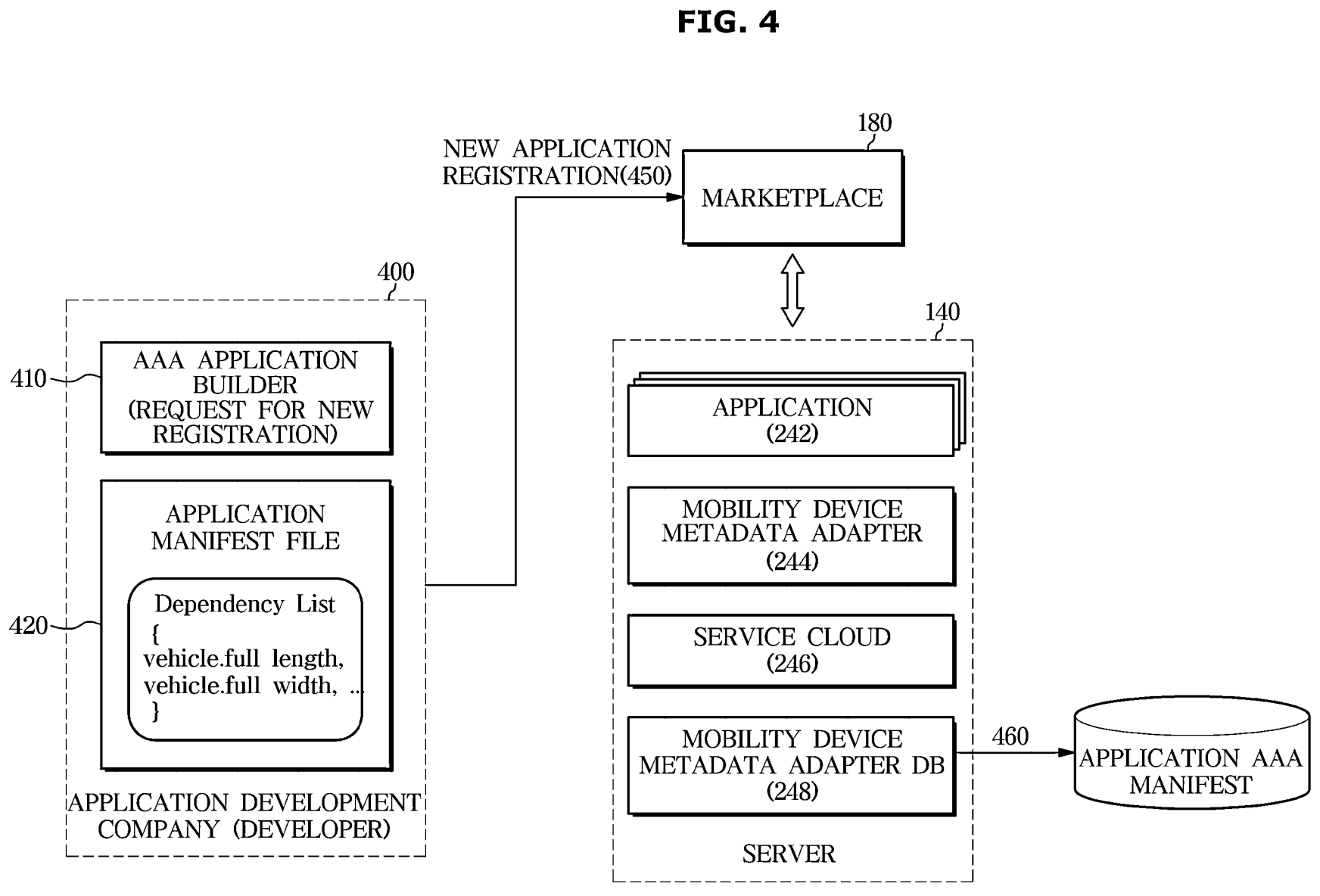

APPLICATION AAA MANIFEST

180

MARKETPLACE

140

APPLICATION (242)

MOBILITY DEVICE METADATA ADAPTER (244)

SERVICE CLOUD (246)

MOBILITY DEVICE METADATA ADAPTER DB (248)

SERVER

460

NEW APPLICATION REGISTRATION(450)

400

410

AAA APPLICATION BUILDER (REQUEST FOR NEW REGISTRATION)

420

APPLICATION MANIFEST FILE

Dependency List
{
vehicle.full length,
vehicle.full width, ...
}

APPLICATION DEVELOPMENT COMPANY (DEVELOPER)

FIG. 6

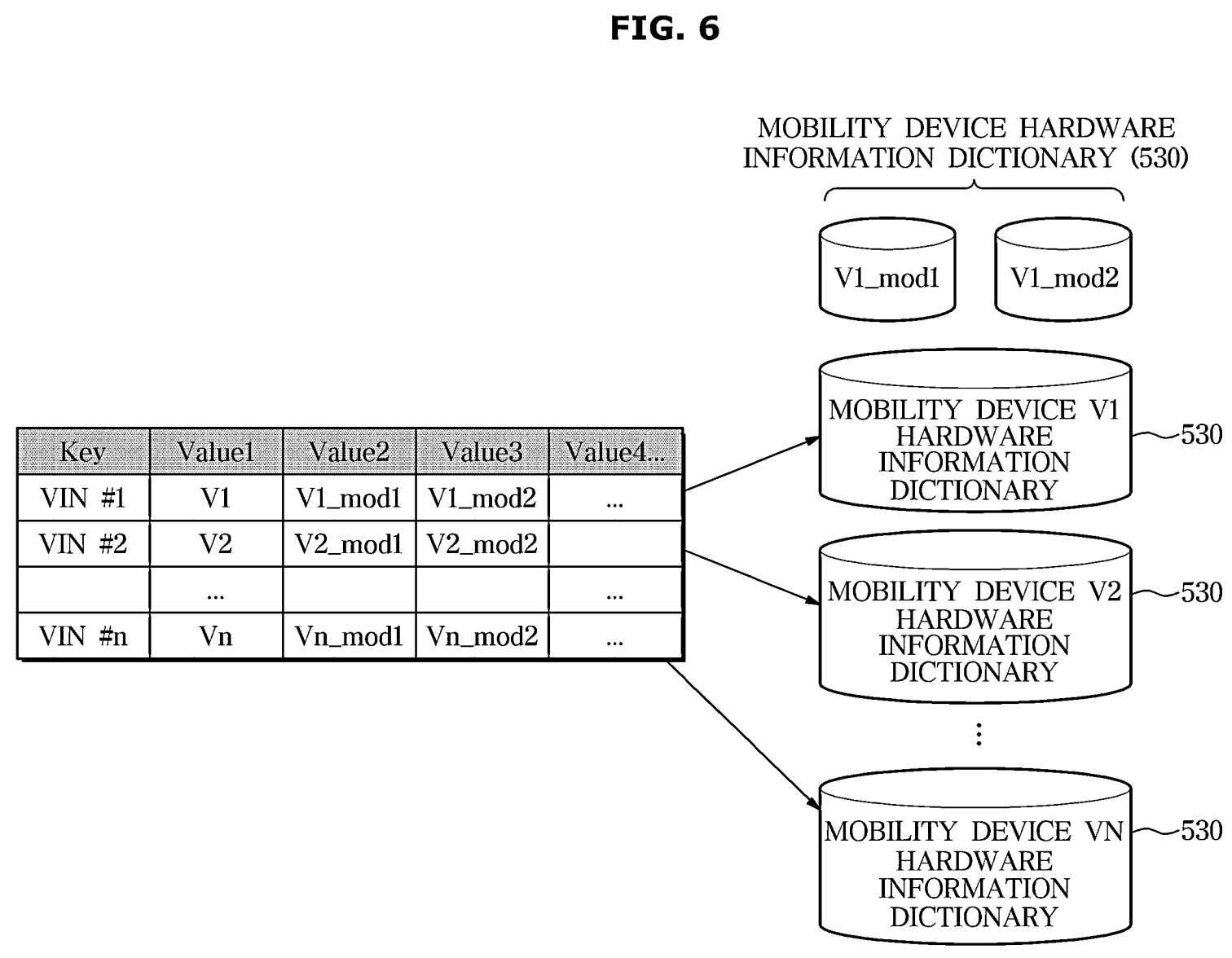

MOBILITY DEVICE HARDWARE INFORMATION DICTIONARY (530)

| V1_mod1 | V1_mod2 |

| MOBILITY DEVICE V1 HARDWARE INFORMATION DICTIONARY | ~530 |
| MOBILITY DEVICE V2 HARDWARE INFORMATION DICTIONARY | ~530 |
| ⋯ | |
| MOBILITY DEVICE VN HARDWARE INFORMATION DICTIONARY | ~530 |

| Key | Value1 | Value2 | Value3 | Value4... |
|---|---|---|---|---|
| VIN #1 | V1 | V1_mod1 | V1_mod2 | ... |
| VIN #2 | V2 | V2_mod1 | V2_mod2 | ... |
| VIN #n | Vn | Vn_mod1 | Vn_mod2 | ... |

FIG. 7

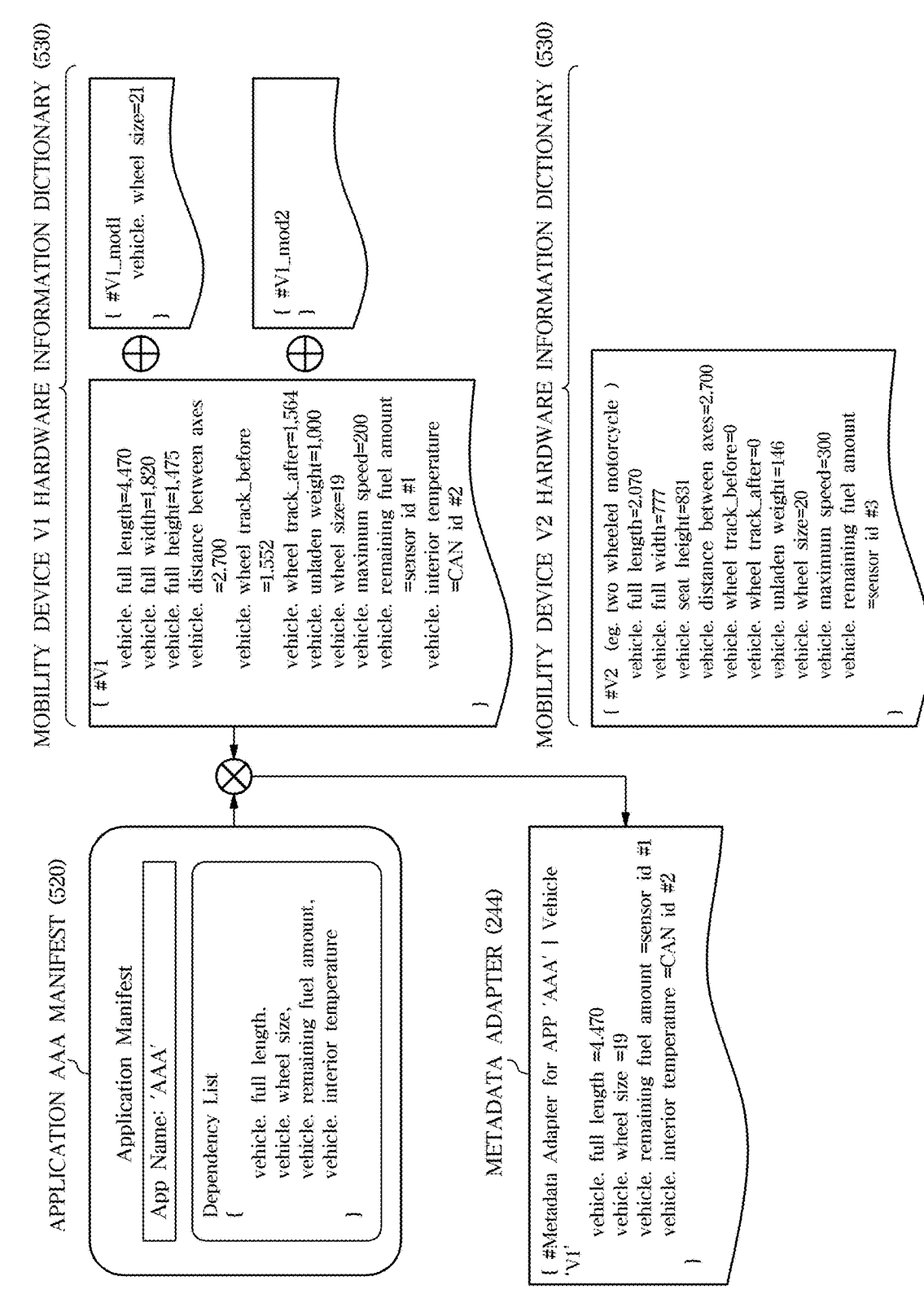

MOBILITY DEVICE V1 HARDWARE INFORMATION DICTIONARY (530)

```
{ #V1
    vehicle. full length=4,470
    vehicle. full width=1,820
    vehicle. full height=1,475
    vehicle. distance between axes
        =2,700
    vehicle. wheel track_before
        =1,552
    vehicle. wheel track_after=1,564
    vehicle. unladen weight=1,000
    vehicle. wheel size=19
    vehicle. maximum speed=200
    vehicle. remaining fuel amount
        =sensor id #1
    vehicle. interior temperature
        =CAN id #2
}
```

```
{ #V1_mod1
    vehicle. wheel size=21
}
```

```
{ #V1_mod2
}
```

MOBILITY DEVICE V2 HARDWARE INFORMATION DICTIONARY (530)

```
{ #V2  (eg. two wheeled motorcycle )
    vehicle. full length=2,070
    vehicle. full width=777
    vehicle. seat height=831
    vehicle. distance between axes=2,700
    vehicle. wheel track_before=0
    vehicle. wheel track_after=0
    vehicle. unladen weight=146
    vehicle. wheel size=20
    vehicle. maximum speed=300
    vehicle. remaining fuel amount
        =sensor id #3
}
```

APPLICATION AAA MANIFEST (520)

```
Application Manifest
App Name: 'AAA'

Dependency List
{
    vehicle. full length,
    vehicle. wheel size,
    vehicle. remaining fuel amount,
    vehicle. interior temperature
}
```

METADATA ADAPTER (244)

```
{ #Metadata Adapter for APP 'AAA' | Vehicle
'V1'
    vehicle. full length =4,470
    vehicle. wheel size =19
    vehicle. remaining fuel amount =sensor id #1
    vehicle. interior temperature =CAN id #2
}
```

Figure 9:
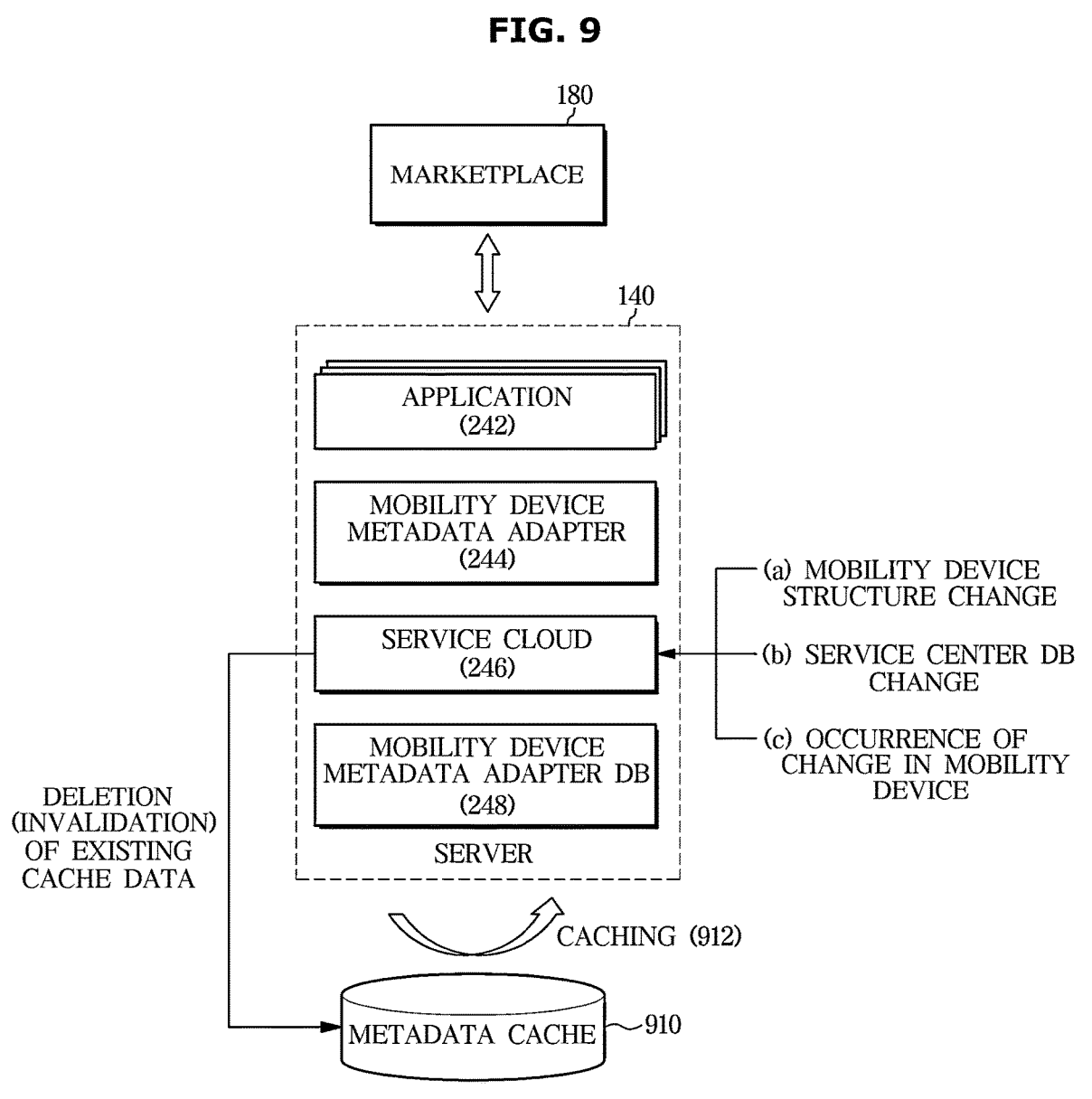

```
┌─────────────────────────┐
│      MARKETPLACE        │
└─────────────────────────┘
```

⇕

140

```
┌ ─ ─ ─ ─ ─ ─ ─ ─ ─ ─ ─ ─ ─ ─ ─ ┐
  ┌───────────────────────────┐
│ │      APPLICATION          │ │
  │        (242)              │
│ └───────────────────────────┘ │
  ┌───────────────────────────┐
│ │    MOBILITY DEVICE        │ │
  │   METADATA ADAPTER        │
│ │        (244)              │ │
  └───────────────────────────┘
│ ┌───────────────────────────┐ │
  │    SERVICE CLOUD          │
│ │        (246)              │ │
  └───────────────────────────┘
│ ┌───────────────────────────┐ │
  │    MOBILITY DEVICE        │
│ │  METADATA ADAPTER DB      │ │
  │        (248)              │
│ └───────────────────────────┘ │
           SERVER
└ ─ ─ ─ ─ ─ ─ ─ ─ ─ ─ ─ ─ ─ ─ ─ ┘
```

(a) MOBILITY DEVICE
    STRUCTURE CHANGE (b) SERVICE CENTER DB
    CHANGE (c) OCCURRENCE OF
    CHANGE IN MOBILITY
    DEVICE

DELETION
(INVALIDATION)
OF EXISTING
CACHE DATA

CACHING (912)

```
┌─────────────────────────┐
│    METADATA CACHE       │ ~910
└─────────────────────────┘
```

METHOD AND SYSTEM FOR INSTALLING AN APPLICATION IN A VEHICLE

CROSS-REFERENCE TO RELATED APPLICATION(S)

This application is based on and claims priority under 35 U.S.C. § 119 to Korean Patent Application No. 10-2022-0135599, filed on Oct. 20, 2022, in the Korean Intellectual Property Office, the disclosure of which is incorporated by reference herein in its entirety.

BACKGROUND

1. Technical Field

The disclosure relates to a vehicle or mobility device, and more particularly to the installation of an application in a vehicle or mobility device.

2. Description of the Related Art

Development of various applications for driving various devices of a mobility device (e.g., a vehicle or a moving object) is in progress. Such applications may be installed in a mobility device in the form of a Before Market device and may also be updated through an Over-the-Air (OTA). The range of mobility devices and updates of such applications are diverse. Various applications can be installed in an electronic system of these mobility devices in the form of a Before Market device at the production stage of manufacturing of the mobility devices or can be updated through Over-the-Air (OTA) after the mobility devices are sold. Individual binaries optimized for hardware specifications for each mobility device can be built and deployed. Building and deploying individual binaries like this means fragmentation of applications to achieve a common purpose. Additional inefficiency issues such as fragmented binary management may occur.

Edge Intelligence (EI) means that data analysis and solution development are performed together at a site where the data is created. Implementation of edge intelligence at an application level has advantages such as relatively better response speed and security compared to implementation of edge intelligence in a cloud-based server. For example, compared to a method of calculating scores in a server based on characteristic data of mobility devices collected for usage-based insurance (UBI) service development, a method in which information collection and score calculation is performed in real-time in a mobility device itself may obtain better results in terms of data accuracy and processing speed.

However, data analysis for implementing edge intelligence in a mobility device may require metadata for tuning individual codes. The requirement of metadata may depend on different hardware characteristics of each mobility device to obtain uniform data analysis and derivation of results. Metadata means one set of data accompanying another set of data to help analyze and classify structured information and add additional information (e.g., data of data). For example, metadata may be objects or items to be identified or controlled for integrated data management.

SUMMARY

In order to increase the utilization of an application installed in a mobility device by implementing edge intelligence in the mobility device, deployment of metadata optimized for the hardware of each mobility device must be performed. It is an aspect of the disclosure to provide a method and system for installing an application in a mobility device for efficient management/transmission of metadata in implementing edge intelligence in the mobility device.

Additional aspects of the disclosure are set forth in part in the description that follows and, in part, should be more apparent from the description or may be learned by practice of the disclosure.

In accordance with an aspect of the disclosure, a method of installing an application in a mobility device includes: securing data matched to the mobility device in a server based on application installation information included in an application installation request in response to the application installation request received from the mobility device; creating a metadata adapter of the application in the server based on the secured matching data; transmitting the created metadata adapter together with binary data of the application from the server to the mobility device; and installing the application in the mobility device using the metadata adapter transmitted from the server to the mobility device.

The creating of the metadata adapter may be performed through combination of a manifest of the application and a hardware information dictionary of the mobility device.

The hardware information dictionary of the mobility device may include unique identification information of the mobility device and may include at least one characteristic value of the mobility device associated with the identification information.

The server, when the mobility device is unidentified, may create the metadata adapter based on a default hardware information dictionary predefined for a mobility device in which hardware information of the mobility device is unidentified.

The creating of the metadata adapter may include overwriting existing metadata with updated metadata among metadata of the metadata adapter when the metadata of the metadata adapter and metadata already embedded in the mobility device do not match each other.

The creating of the metadata adapter may include storing frequently used data or instructions related to metadata of the metadata adapter in a metadata cache, invalidating or deleting cache data determined to be unusable among cache data of the metadata cache, and generating new data to update the metadata cache when a request to create a metadata adapter occurs.

Criteria for determining that the cache data is unusable may include when a structural change of the mobility device is made.

Criteria for determining that the cache data is unusable may include when contents of a maintenance-related database of the mobility device are changed.

Criteria for determining that the cache data is unusable may include when a change point occurs in at least one characteristic of the mobility device.

The creating of the metadata adapter may include recreating the metadata adapter by replacing metadata of a Before Market device of the mobility device with metadata of an After Market device provided for the mobility device.

Conditions for recreating the metadata adapter may include when a failure occurs in a Before Market device installed in the mobility device.

Conditions for recreating the metadata adapter may include when a Before Market device installed in the mobility device is replaced with an After Market device.

The method may further include storing frequently used data or instructions related to metadata of the metadata adapter in a metadata cache. The method may also include updating, through invalidation or deletion, cache data corresponding to replaced data or instructions among cache data of the metadata cache for recreation of the metadata.

The method may further include transmitting the created metadata adapter and binary data of the application from the server to the mobility device through a piggyback method.

In accordance with another aspect of the disclosure, a system for installing an application in a mobility device includes the mobility device having at least one device driven by the application and includes a server provided to create a metadata adapter for installation of the application in the mobility device. The system is configured to: secure data matched to the mobility device in the server based on application installation information included in an application installation request in response to the application installation request received from the mobility device; create a metadata adapter of the application in the server based on the secured matching data; transmit the created metadata adapter together with binary data of the application from the server to the mobility device; and install the application in the mobility device using the metadata adapter transmitted from the server to the mobility device.

The creating of the metadata adapter may be performed through combination of a manifest of the application and a hardware information dictionary of the mobility device.

The hardware information dictionary of the mobility device may include unique identification information of the mobility device and may include at least one characteristic value of the mobility device associated with the identification information.

When the mobility device is unidentified, the server may create the metadata adapter based on a default hardware information dictionary predefined for a mobility device in which hardware information of the mobility device is unidentified.

The creating of the metadata adapter may include overwriting existing metadata with updated metadata among metadata of the metadata adapter when the metadata of the metadata adapter and metadata already embedded in the mobility device do not match each other.

The creating of the metadata adapter may include storing frequently used data or instructions related to metadata of the metadata adapter in a metadata cache, invalidating or deleting cache data determined to be unusable among cache data of the metadata cache, and generating new data to update the metadata cache when a request to create a metadata adapter occurs.

Criteria for determining that the cache data is unusable may include when a structural change of the mobility device is made.

Criteria for determining that the cache data is unusable may include when contents of a maintenance-related database of the mobility device are changed.

Criteria for determining that the cache data is unusable may include when a change point occurs in at least one characteristic of the mobility device.

The creating of the metadata adapter may include recreating the metadata adapter by replacing metadata of a Before Market device of the mobility device with metadata of an After Market device provided for the mobility device.

Conditions for recreating the metadata adapter may include when a failure occurs in a Before Market device installed in the mobility device.

Conditions for recreating the metadata adapter may include when a Before Market device installed in the mobility device is replaced with an After Market device.

The system may further include storing frequently used data or instructions related to metadata of the metadata adapter in a metadata cache. The system may also include updating, through invalidation or deletion, cache data corresponding to replaced data or instructions among cache data of the metadata cache for recreation of the metadata.

The system may further include transmitting the created metadata adapter and binary data of the application from the server to the mobility device through a piggyback method.

BRIEF DESCRIPTION OF THE DRAWINGS

These and/or other aspects of the disclosure should become more apparent and more readily appreciated from the following description of the embodiments, taken in conjunction with the accompanying drawings of which:

FIG. 4 is a diagram illustrating an advance preparation process for creating a mobility device metadata adapter in the method of updating/installing software in the mobility device illustrated in FIG. 3;

FIG. 6 is a diagram illustrating a method of identifying a known mobility device model in the method of automatically creating the mobility device metadata adapter illustrated in FIG. 5;

FIG. 7 is a diagram illustrating an example of a manifest of the method of identifying the known mobility device model and mobility device hardware information in FIG. 6;

FIG. 9 is a diagram illustrating another embodiment of the method of automatically creating a mobility device metadata adapter in the method of updating/installing software in the mobility device illustrated in FIG. 3.

DETAILED DESCRIPTION

Figure 1:
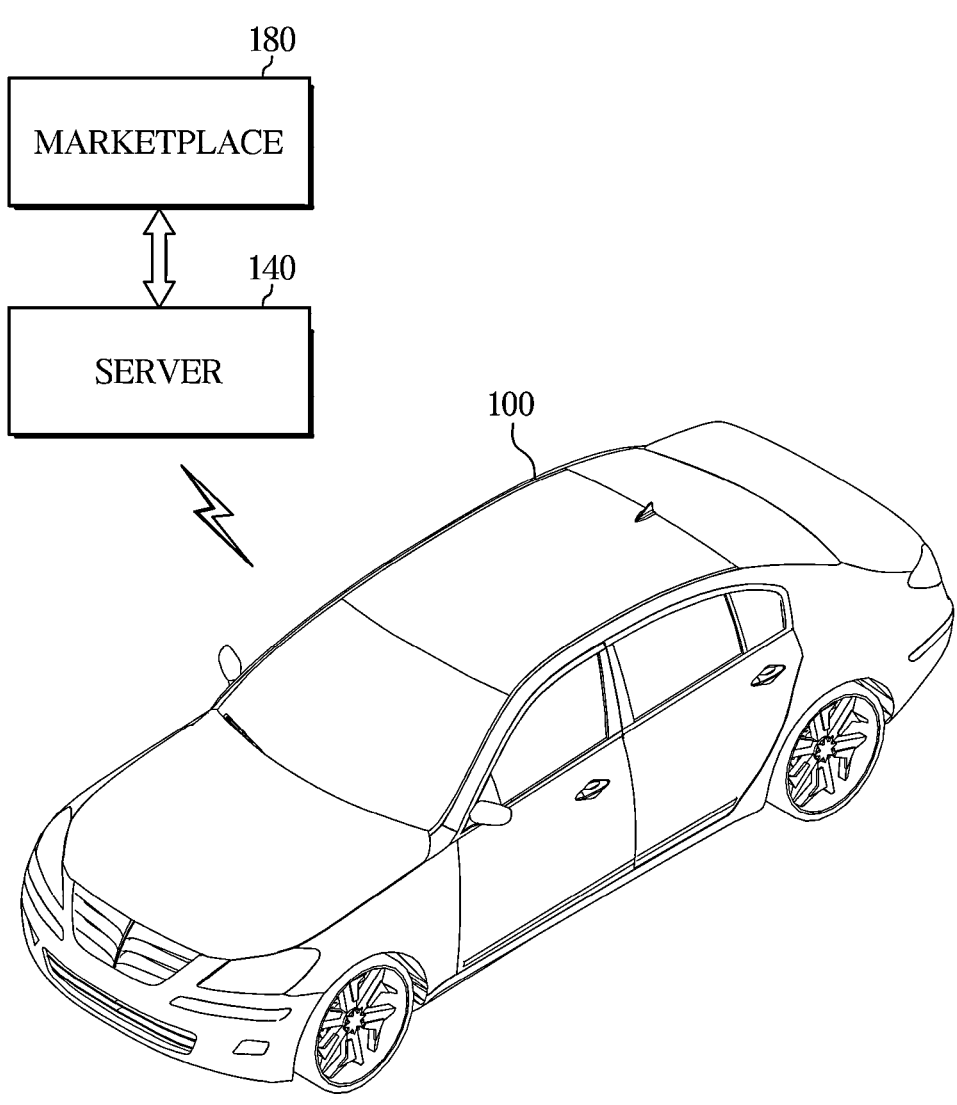
FIG. 1 is a diagram illustrating communication between a mobility device and a server according to an embodiment of the disclosure.

Throughout the specification, like reference numerals refer to like components. This specification does not describe all features of embodiments, and duplicative contents between general contents or embodiments in the technical field of the disclosure have been omitted. The terms 'part,' 'module,' 'member,' and 'device' used in this specification may be embodied as software or hardware. It is also possible for a plurality of 'parts,' 'modules,' 'members,' and 'devices' to be embodied as one component, or one part,' 'module,' 'member,' and 'device' to include a plurality of components according to the embodiments.

Throughout the specification, when a part is referred to as being "connected" to another part, this includes not only a direct connection but also an indirect connection. The indirect connection includes connecting through a wireless network.

When it is described that a part "includes" a component, it means that the part may further include other components, not excluding the other components unless specifically stated otherwise.

Throughout the specification, when a component is referred to as being located "on" or "over" another component, this includes not only when a component is in contact with another component but also when another component exists between the two components.

The terms 'first,' 'second,' and the like are used to distinguish one component from another component. The components are not limited by the above-mentioned terms.

The singular forms "a," "an," and "the" include plural referents unless the context clearly dictates otherwise. As used herein, mobility device may refer to any type of vehicle or moving object to which the inventive concepts may be applied.

In each step, an identification numeral is used for convenience of explanation. The identification numeral does not describe the order of the steps. Each step may be performed differently from the order specified unless the context clearly states a particular order.

Hereinafter, an operation principle and embodiments of the disclosure are described with reference to the accompanying drawings. When a component, device, element, or the like, of the present disclosure is described as having a purpose or performing an operation, function, or the like, the component, device, or element should be considered herein as being "configured to" meet that purpose or to perform that operation or function.

FIG. 1 is a diagram illustrating communication between a mobility device and a server according to an embodiment of the disclosure.

In FIG. 1, a mobility device 100 may download an application from a marketplace 180 through a server 140 or may update an existing application that is already installed through an Over-the-Air (OTA).

In FIG. 1, the marketplace 180 is responsible for registration, management, relaying, and deployment of applications.

Figure 2:
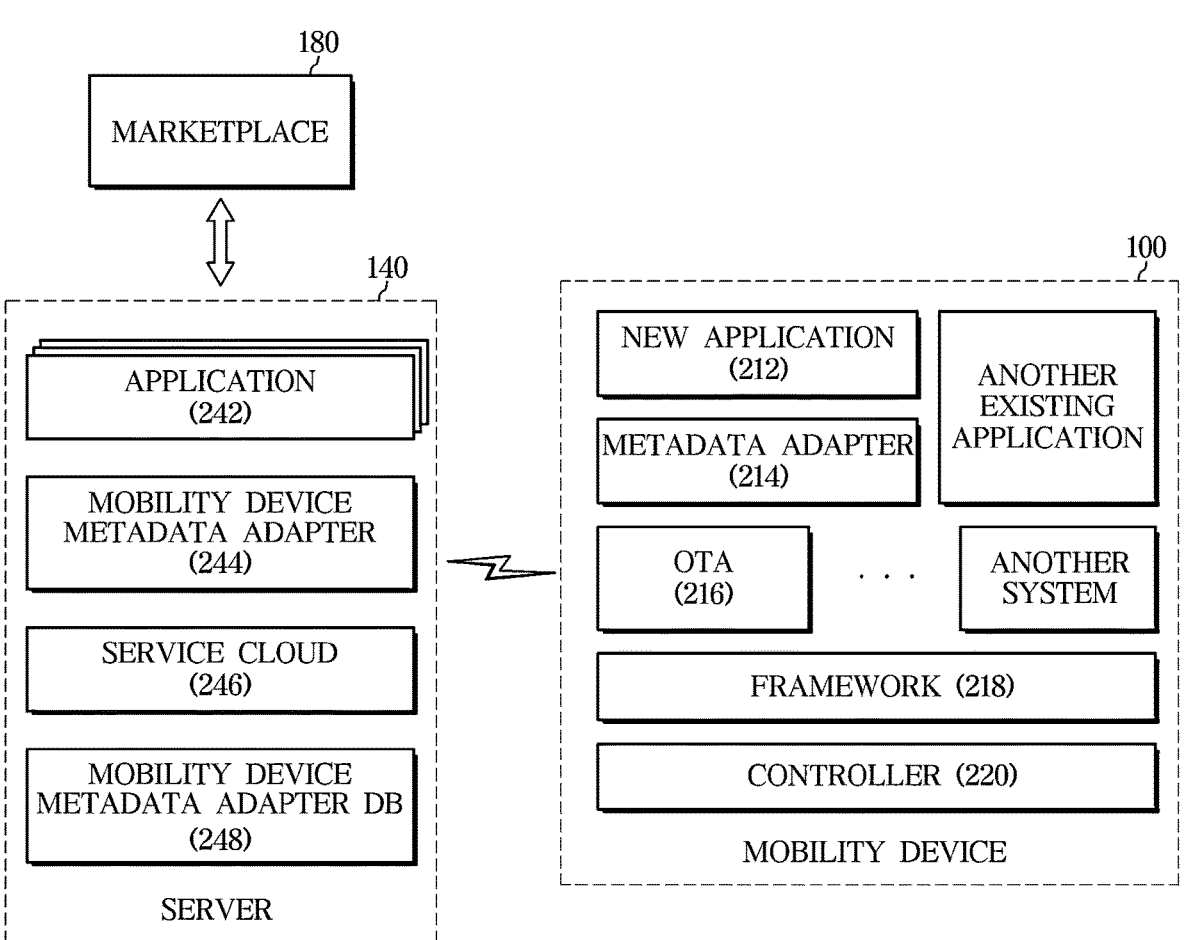
FIG. 2 is a diagram illustrating a configuration of each of the mobility device and server illustrated in FIG. 1.

FIG. 2 is a diagram illustrating a configuration of each of the mobility device and server illustrated in FIG. 1.

As illustrated in FIG. 2, the mobility device 100 includes a new application 212, a metadata adapter 214, an application update/installer (OTA) 216, a framework 218, a controller 220, and the like.

The new application 212 refers to an application newly installed in the mobility device 100. Another existing application may already be installed and used in the mobility device 100.

The metadata adapter 214 is created by combining an application manifest and mobility device hardware information. The application manifest is indicated by reference numeral 520 in FIGS. 5-7, and the mobility device hardware information is Indicated by reference numeral 530 in FIGS. 5-7.

In an embodiment of the disclosure, the metadata adapter 214 is 'automatically' created by the server 140 upon application update/installation. Herein, to be 'automatically' created means that the creation of the mobility device metadata adapter 214 may proceed merely by receiving an application update/installation request without an additional instruction or operation other than receiving the application update/installation request.

The application update/installer 216 is responsible for updating or installing applications of the mobility device 100. For example, the application update/installer 216 may be an Over-the-Air (OTA) provided to update software or firmware.

The controller 220 may be an electronic control unit (ECU) provided for installation operation of applications of the mobility device 100.

As illustrated in FIG. 2, the server 140 includes a plurality of applications 242, a mobility device metadata adapter 244, a service cloud 246, a mobility device metadata database 248, and the like.

The plurality of applications 242 may be installed in the mobility device 100 to drive various devices of the mobility device 100.

The mobility device metadata adapter 244 operates such that applications installed in the mobility device 100 may always operate in the same way regardless of the type (characteristic) of the mobility device 100.

The service cloud 246 is responsible for communication with the application update/installer 216 of the mobility device 100.

The mobility device metadata database 248 stores metadata for each type of mobility device.

The controller may be implemented as a memory (not shown) for storing an algorithm for controlling the operations of the components in the mobility device or data for a program reproducing the algorithm and a processor (not shown) for performing the above-described operations using data stored in the memory. In this case, the memory and the processor may be implemented as separate chips or may be implemented as a single chip.

A communication device may include one or more components that enable communication with an external device, and may include, for example, at least one of a short-range communication module, a wired communication module, or a wireless communication module.

The short-range communication module may include various short-range communication modules that transmit and receive signals using a wireless communication network in a short distance such as a Bluetooth module, an infrared communication module, a radio frequency identification (RFID) communication module, a wireless local access network (WLAN) communication module, a near field communication (NFC) module, and a Zigbee communication module.

The wired communication module may include various cable communication modules such as a universal serial bus (USB), a high definition multimedia interface (HDMI), a digital visual interface (DVI), a recommended standard 232 (RS-232), a power line communication, and a plain old telephone service (POTS). The communication module may also include various wired communication modules such as a controller area network (CAN) communication module, a local area network (LAN) module, a wide area network (WAN) module, and a value added network (VAN) module.

The wireless communication module, in addition to a Wi-Fi module and a wireless broadband module, may include wireless communication modules that support various wireless communication methods such as a global system for mobile communication (GSM), a code division multiple access (COMA), a wideband code division multiple access (WCDMA), a universal mobile telecommunication system (UMTS), a time division multiple access (TDMA), and Long-Term Evolution (LTE).

The wireless communication module may include a wireless communication interface including an antenna and a transmitter for transmitting signals. The wireless communication module may further include a signal conversion module for modulating a digital control signal output from the controller through the wireless communication interface into an analog type wireless signal under the control of the controller.

The wireless communication module may include a wireless communication interface including an antenna and a receiver for receiving signals. The wireless communication module may further include a signal conversion module for demodulating an analog type wireless signal received through the wireless communication interface into a digital control signal.

A storage device may be implemented as at least one of a non-volatile memory device such as a cache, a read only memory (ROM), a programmable ROM (PROM), an erasable programmable ROM (EPROM), an electrically erasable programmable ROM (EEPROM), and a flash memory, a volatile memory device such as a random access memory (RAM), and a storage medium such as a hard disk drive (HOD) and a compact-disk ROM (CD-ROM), but is limited thereto. The storage device may be the memory implemented as a chip separate from the processor described above in relation to the controller or may be implemented as a single chip with the processor.

A display device may include a cathode ray tube (CRT), a digital light processing (DLP) panel, a plasma display panel, a liquid crystal display (LCD) panel, an electro luminescence (EL) panel, an electrophoretic display (EPD) panel, an electrochromic display (ECD) panel, a light emitting diode (LED) panel or an organic light emitting diode (OLED) panel but is not limited thereto.

An input device may include hardware devices such as various buttons or switches, pedals, keyboards, mice, trackballs, various levers, handles, and sticks, for user input.

The input device may also include a graphical user interface (GUI), i.e., a software device, such as a touch pad for user input. The touch pad may be implemented as a touch screen panel (TSP) to form a mutual layer structure with the display device.

When configured as the touch screen panel (TSP) forming a mutual layer structure with the touch pad, the display device may also be used as the input device.

At least one component may be added or deleted depending on the performance of the components of the mobility device 100 and the server 140 illustrated in FIG. 2. It should be more easily understood by those having ordinary skill in the art that the mutual positions of the components may be changed depending on the performance or structure of the system.

Figure 3:
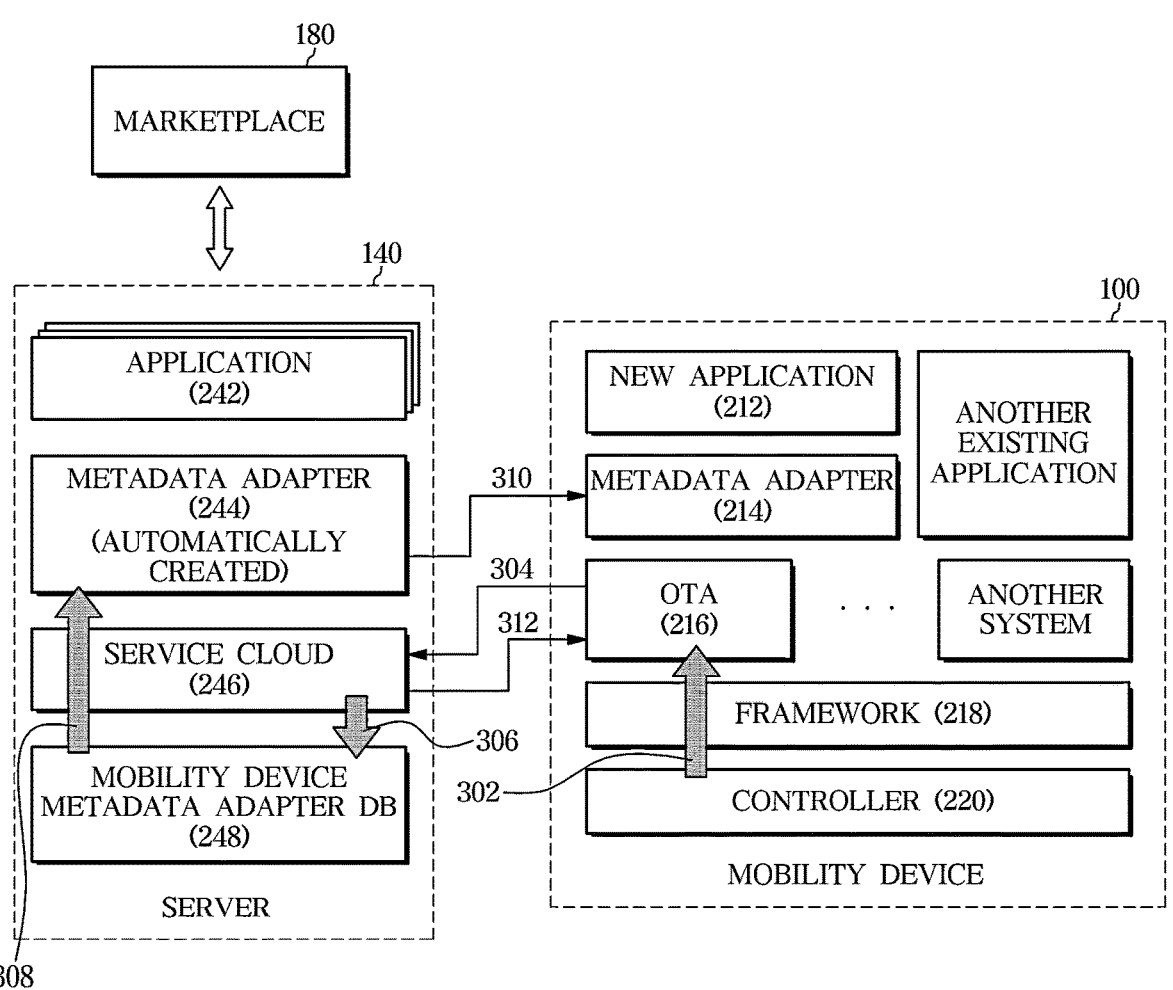
FIG. 3 is a diagram illustrating a method of updating/installing software in the mobility device according to an embodiment of the disclosure.

Each of the components illustrated in FIG. 2 means a software component and/or a hardware component such as a field-programmable gate array (FPGA) and an application specific integrated circuit (ASIC), FIG. 3 is a diagram illustrating a method of updating/installing software in the mobility device according to an embodiment of the disclosure. In a method of updating/installing software in FIG. 3, when binary data of an application to be newly installed in the mobility device 100 is downloaded from the server 140 to the mobility device 100, the mobility device metadata adapter 244 suitable for the characteristics of the mobility device 100 is 'automatically' created in the server 140 and downloaded to the mobility device 100 in a piggyback method together with application data.

As illustrated in FIG. 3, the controller 220 transmits identification information of the mobility device 100 to the application update/installer 216 (302).

The application update/installer 216 transmits the application update/installation request to the service cloud 246 of the server 140 (304). The application update/installation request may include the identification information of the mobility device 100 and a list of update/installation target applications. The identification information of the mobility device 100 may be a mobility device identification number (VIN) of the mobility device 100.

In response to receiving the application update/installation request, the server 140 inquires and secures data matched with the mobility device 100 from the mobility device metadata database 248 of the server 140 based on the identification information of the mobility device 100 included in the application update/installation request and application update/installation information corresponding to the list of update/installation target applications (306).

The server 140 'automatically' creates the new mobility device metadata adapter 244 related to a new application to be installed based on the secured matching data (308).

In addition, the server 140 transmits the 'automatically' created mobility device metadata adapter 244 to the mobility device 100 in the piggyback method together with binary data of an application to be newly installed (310). In the mobility device 100, the new application 212 is installed in the mobility device 100 through the new mobility device metadata adapter 244 that is 'automatically' created in the server 140 and transmitted to the mobility device 100. The mobility device metadata adapter 214 enables one application to be applied to various types of vehicles or mobility devices. The mobility device metadata adapter provides convenience in development and operation by providing an abstraction for sub-information of the mobility device to the application.

When the update/installation of the new application 310 by the new mobility device metadata adapter 244 in the mobility device 100 is completed, the service cloud 246 of the server 140 notifies the application update/installer 216 of the mobility device 100 that the update/installation of the application is completed (312).

As such, when a new application is updated/installed, the new mobility device metadata adapter 244 is 'automatically' created in the server 140 and transmitted to the mobility device 100. The new application 212 is also installed in the mobility device 100 through the 'automatically' created new mobility device metadata adapter 244, so that the new application 212 may be installed quickly and simply.

FIG. 4 is a diagram illustrating an advance preparation process for creating a mobility device metadata adapter in the method of updating/installing software in the mobility device illustrated in FIG. 3.

In FIG. 4, an application development company (developer) 400 is a subject of application development. The application builder 410 converts a source code the into an executable independent form. An application manifest file 420 includes dependency metadata information (i.e., dependency list) required by a new application (AAA). In addition, the application manifest file 420 may further include other information such as an application name for registration in a marketplace other than the marketplace 180.

As illustrated in FIG. 4, in a development stage of the new application AAA, the application builder 410 and the application manifest file 420 are created, and the new application AAA is registered in the marketplace 180 (450).

In addition, dependency metadata information for each application is recorded (stored) in the mobility device metadata database 248 provided in the server 140 (460). The dependency metadata information for each application may have a unique ID for identifying each application. Dependency metadata information of a new application AAA is also stored in the mobility device metadata database 248 of the server 140.

Figure 5:
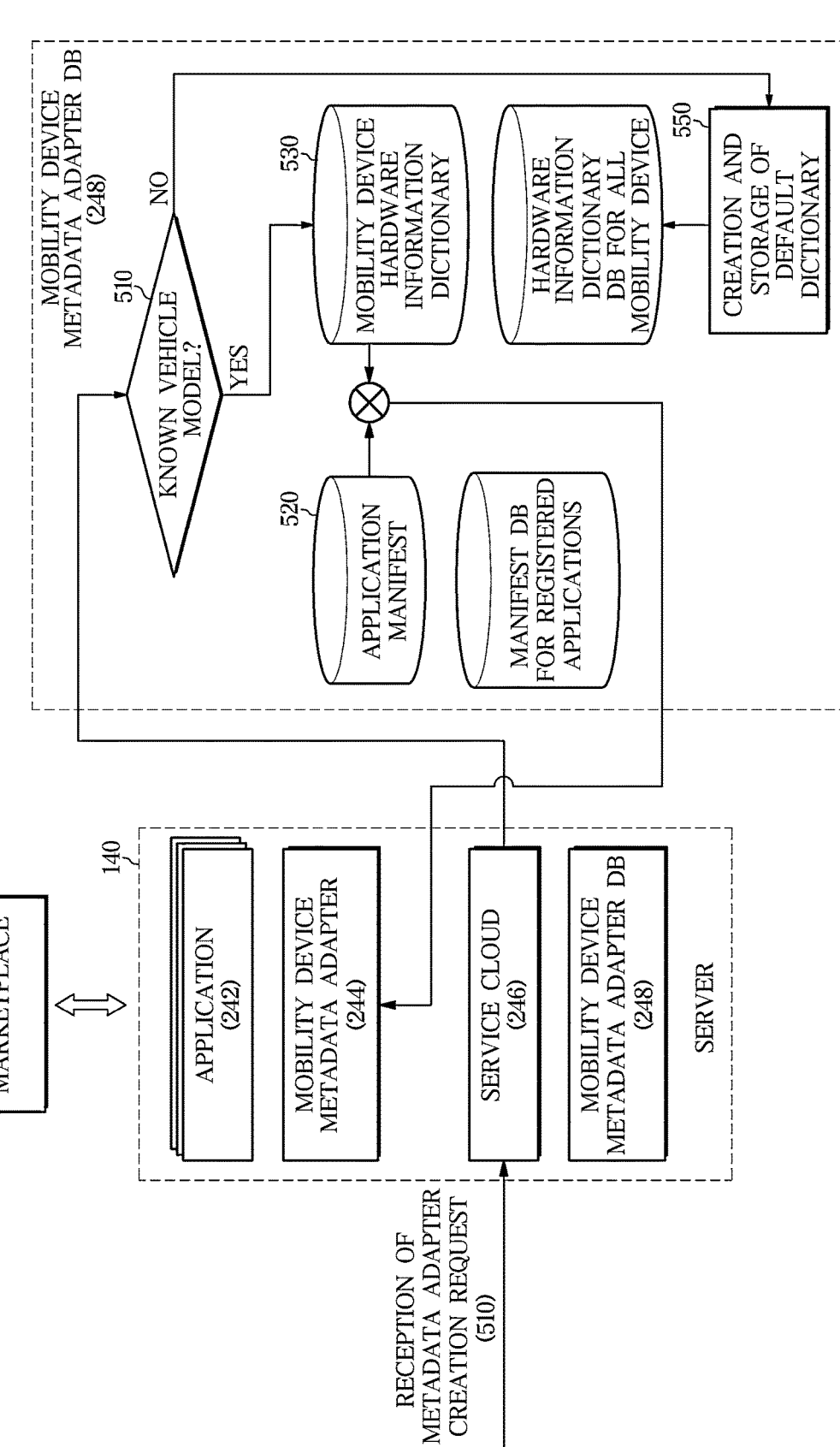
FIG. 5 is a diagram illustrating a method of automatically creating the mobility device metadata adapter in the method of updating/installing software in the mobility device illustrated in FIG. 3.

FIG. 5 is a diagram illustrating a method of automatically creating the mobility device metadata adapter in the method of updating/installing software in the mobility device illustrated in FIG. 3.

As illustrated in FIG. 5, the service cloud 246 of the server 140 may receive a mobility device metadata adapter creation request from the application update/installer 216 (510). When the corresponding mobility device 100 is a known (identified) mobility device ("YES" in 510), the service cloud 246 allows mutual coupling between a manifest 520 of the corresponding application AAA and a hardware information dictionary 540 of the corresponding mobility device 100 (distinguished as V1 for convenience). The service cloud 246 allows for this mutual coupling by using an application identifier (e.g., unique number) and mobility device identifier (e.g., mobility device identification number) transmitted from the application update/installer 216 when receiving the mobility device metadata adapter creation request. By providing the result of this combination to the service cloud 246 of the server 140, the service cloud 246 of the server 140 may finally create a mobility device metadata adapter based on the result of the combination.

When a request to create a mobility device metadata adapter for an unknown (unidentified) mobility device occurs ('NO' in 510), a mobility device metadata adapter may be created based on a default hardware information dictionary predefined for a mobility device in which hardware information of a new mobility device is unknown (unidentified) (550). Alternatively, when a request to create a mobility device metadata adapter for an unknown (unidentified) mobility device occurs, a safety problem may be prevented from occurring by stopping the update/installation of the application for the unidentified mobility device.

FIG. 6 is a diagram illustrating a method of identifying a known mobility device model in the method of automatically creating the mobility device metadata adapter illustrated in FIG. 5.

As illustrated in FIG. 6, a hardware information dictionary 530 having a hash table structure may be provided to identify whether the corresponding mobility device 100 is a known mobility device model. Hardware information for each mobility device (V1, V2, . . . , Vn) listed in the hardware information dictionary 530 may be composed of a key and a plurality of different characteristic values. Herein, the key may be unique identification information (for example, mobility device identification number) of each of the plurality of mobility devices (V1, V2, . . . , Vn). The plurality of different characteristic values is one or more characteristic values associated with a corresponding mobility device classified as a key.

When there is identification information (e.g., a mobility device identification number (VIN)) of the mobility device 100 (e.g., V1) to which the current application is to be updated/installed in the hardware information dictionary 530 having a table structure, the corresponding mobility device may be recognized as a known (identified) mobility device. Also, characteristic values (V1, V1_mod1, V1_mod2, . . . ) of the corresponding mobility device V1 may be used as an ID value referring to the hardware information dictionary.

When there is a plurality of characteristic values corresponding to one key, a plurality of the mobility device hardware information dictionaries 530 may be combined with the application manifest 520 (see FIG. 5) to create a final mobility device metadata adapter.

FIG. 7 is a diagram illustrating an example of a manifest of the method of identifying the known mobility device model and mobility device hardware information in FIG. 6.

As illustrated in FIG. 7, the dependency metadata information (i.e., dependency list) of the manifest 520 of the application AAA is a 'full length' and 'wheel size' of the mobility device, a 'remaining fuel amount', and an 'interior temperature'. In the hardware information dictionary 530 of the mobility device V1 corresponding thereto, characteristic values such as a 'full length', a 'full width', a 'full height', and a 'distance between axes' of the mobility device V1, a 'wheel track before', a 'wheel track after', a 'unladen weight', a 'wheel size', a 'maximum speed', a 'remaining fuel amount', and an 'interior temperature' are listed. The mobility device metadata adapter 244 in FIG. 7 is created by combining the application manifest 520 and the mobility device hardware information dictionary 530 as described above. In other words, the mobility device metadata adapter 244 created for the application AAA is an output in which a characteristic value of a corresponding item of the mobility device hardware information dictionary 530 is combined to each item of the application manifest 520, such as 'length=4, 470' 'wheel size=19', 'remaining fuel amount=sensor id #1', and 'interior temperature=CAN id #2'.

The mobility device metadata adapter 244 as described above may be created for each of the mobility device V1 and mobility device V2, and the new mobility device metadata adapter 244 created in this way may be provided to the mobility device 100 (V1 or V2) in the piggyback method together with the application binary and used for updating/installing the application.

Figure 8:
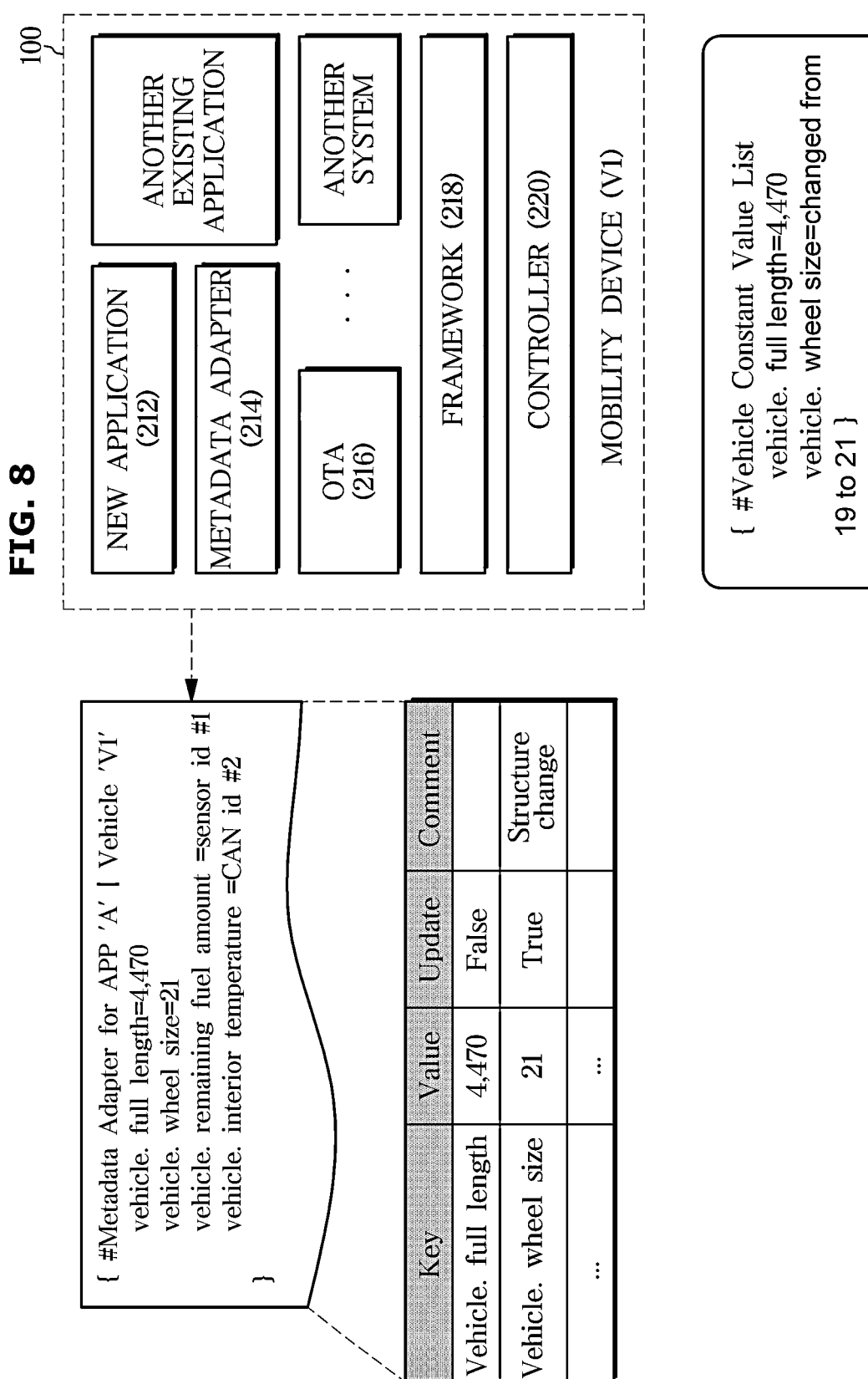
FIG. 8 is a diagram illustrating another embodiment of the method of automatically creating a mobility device metadata adapter in the method of updating/installing software in the mobility device illustrated in FIG. 3.

FIG. 8 is a diagram illustrating another embodiment of the method of automatically creating a mobility device metadata adapter in the method of updating/installing software in the mobility device illustrated in FIG. 3.

Information on a specific item of metadata of the mobility device 100 may be embedded in the mobility device during production or may be embedded in an electronic element mounted in the mobility device. In this case, information embedded in the mobility device or information embedded in the electronic element may be used.

When the information of the metadata adapter 244 and the information already embedded in each electronic element of the mobility device do not match, attributes of the information in the mobility device metadata adapter 244 are examined. When an update flag is set to 'True', existing metadata is overwritten with the updated metadata.

As illustrated in FIG. 8, the value of the 'wheel size' item of metadata is '19 (inches)', but the value of the updated 'wheel size' item is '21 (inches)'. In this case, the value of the corresponding item of the mobility device metadata adapter is overwritten with '21 (inch)', which is the value of the updated 'wheel size' item.

FIG. 9 is a diagram illustrating another embodiment of the method of automatically creating a mobility device metadata adapter in the method of updating/installing software in the mobility device illustrated in FIG. 3.

In FIG. 9, a metadata cache 910 is a data store that temporarily stores frequently used data or instructions related to metadata. When metadata is created in the server 140, the metadata cache 910 may be used for a high processing speed and reduction in computational complexity (912).

However, when there is cache data that is determined to be unusable among the cache data of the existing metadata cache 910, the server 140 'invalidates (or deletes)' the corresponding cache data. When a request to create the mobility device metadata adapter 244 occurs, the server 140 creates new cache data and updates the metadata cache 910. Conditions for determining that the cache data of the existing metadata cache 910 is unusable may include: (a) when a structure of the mobility device 100 is officially changed; (b) when contents of a maintenance-related database of a designated service center are changed; or (c) when the existing metadata cache may not be used due to the occurrence of a change point in the characteristics of the mobility device.

Figure 10:
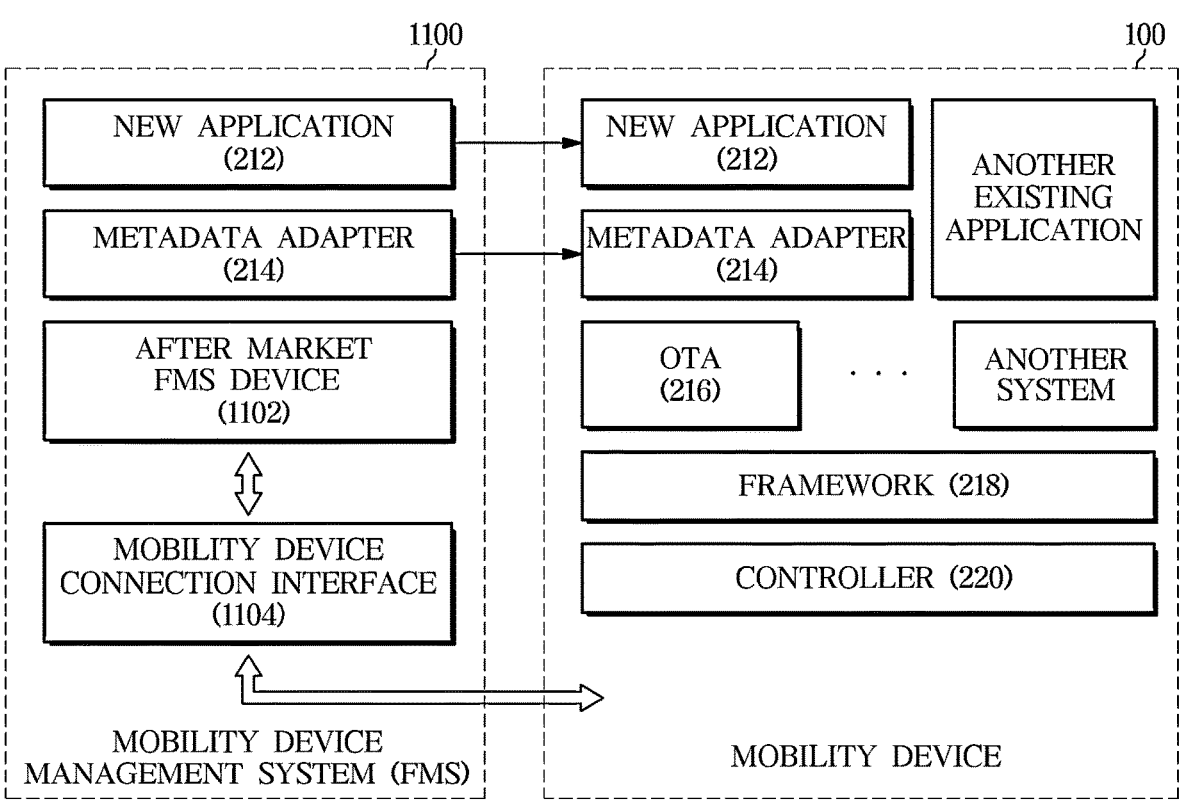
FIG. 10 is a diagram illustrating another embodiment of the method of automatically creating a mobility device metadata adapter in the method of updating/installing software in the mobility device illustrated in FIG. 3.

FIG. 10 is a diagram illustrating another embodiment of the method of automatically creating a mobility device metadata adapter in the method of updating/installing software in the mobility device illustrated in FIG. 3.

When compatibility of data structures is maintained and the mobility device 100 is produced, the automatically created mobility device metadata adapter 244, according to an embodiment of the disclosure, may also be used for After Market devices in addition to Before Market devices. To this end, a fleet management system (FMS) 1100 for the After Market device may be used. The fleet management system (FMS) 1100 is a system that manages power assets such as commercial vehicles, special-purpose vehicles, aircraft, and ships or non-power assets. In other words, as illustrated in FIG. 10, in order to recreate the mobility device metadata adapter 244 to be suitable for a changed new interface and reinstall the same application 212 through the recreated mobility device metadata adapter 214, the fleet management system (FMS) 1100 may be used. Conditions for recreating the mobility device metadata adapter 244 using the fleet management system 1100 may include (a) when a Before Market device installed in the mobility device 100 fails, or (b) when an existing Before Market device is replaced with a new After Market device.

In this case, because a data collection route from several existing sensors needs to be changed to a new route, it is necessary to use another sensor of an FMS device 1102 of the mobility device management system (FMS) 1100 or revise to another communication interface. To this end, 'invalidation (or deletion)' of the cache described above through the embodiment in FIG. 9 and updating of the mobility device hardware information dictionary 530 according to structural change may be accompanied.

As is apparent from the above, according to the disclosed embodiments, a method and system for installing an application in a mobility device for efficient management/transmission of metadata in implementing edge intelligence in the mobility device can be provided.

In other words, a metadata adapter having a structure suitable for characteristics of each mobility device can be implemented.

By adopting the metadata adapter, one application can be applied to various types of vehicles or mobility devices. Accordingly, deployment of a customized application for each mobility device is unnecessary. In addition, the application of the mobility device can be easily updated through a unified channel such as a marketplace.

In addition, a metadata adapter suitable for the application to be updated: installed can be 'automatically' created in a server.

In addition, the metadata adapter can provide convenience in development and operation by providing an abstraction for sub-information of a mobility device to the application.

The disclosed embodiments may be implemented in the form of a recording medium storing instructions executable by a computer. The instructions may be stored in the form of program code, and when executed by a processor, a program module may be created to perform the operations of the disclosed embodiments. The recording medium may be implemented as a computer-readable recording medium.

The computer-readable recording medium includes any type of recording medium in which instructions readable by the computer are stored. For example, the recording medium may include a read only memory (ROM), a random-access memory (RAM), a magnetic tape, a magnetic disk, a flash memory, an optical data storage device, and the like.

The embodiments disclosed with reference to the accompanying drawings have been described above. It should be understood by those having ordinary skill in the art that various changes in form and details may be made thereto without departing from the spirit and scope of the disclosure as defined by the appended claims. The disclosed embodiments are illustrative and should not be construed as limiting.

What is claimed is:

1. A method of installing an application in a mobility device, the method comprising:

securing data matched to the mobility device in a server based on application installation information included in an application installation request in response to the application installation request received from the mobility device;

creating a metadata adapter of the application in the server based on the secured matched data;

transmitting the created metadata adapter together with binary data of the application from the server to the mobility device; and installing the application in the mobility device using the metadata adapter transmitted from the server to the mobility device, wherein creating the metadata adapter comprises recreating the metadata adapter by replacing metadata of a before market device of the mobility device with metadata of an after market device provided for the mobility device.

2. The method according to claim 1, wherein creating the metadata adapter is performed through a combination of a manifest of the application and a hardware information dictionary of the mobility device.

3. The method according to claim 2, wherein the hardware information dictionary of the mobility device comprises:

unique identification information of the mobility device; and at least one characteristic value of the mobility device associated with the unique identification information.

4. The method according to claim 3, wherein the server, when the mobility device is unidentified, creates the metadata adapter based on a default hardware information dictionary predefined for a mobility device in which hardware information of the mobility device is unidentified.

5. The method according to claim 1, wherein creating the metadata adapter comprises overwriting existing metadata with updated metadata among metadata of the metadata adapter when the metadata of the metadata adapter and metadata already embedded in the mobility device do not match each other.

6. The method according to claim 1, wherein creating the metadata adapter comprises:

storing frequently used data or instructions related to metadata of the metadata adapter in a metadata cache;

invalidating or deleting cache data determined to be unusable among cache data of the metadata cache; and generating new data to update the metadata cache when a request to create a metadata adapter occurs.

7. The method according to claim 6, wherein criteria for determining that the cache data is unusable comprises when a structural change of the mobility device is made.

8. The method according to claim 6, wherein criteria for determining that the cache data is unusable comprises when contents of a maintenance-related database of the mobility device are changed.

9. The method according to claim 6, wherein criteria for determining that the cache data is unusable comprises when a change point occurs in at least one characteristic of the mobility device.

10. The method according to claim 1, wherein conditions for recreating the metadata adapter comprise when a failure occurs in the before-market device installed in the mobility device.

11. The method according to claim 1, wherein conditions for recreating the metadata adapter comprise when the before-market device installed in the mobility device is replaced with the after-market device.

12. The method according to claim 1, further comprising:

storing frequently used data or instructions related to metadata of the metadata adapter in a metadata cache; and updating, through invalidation or deletion, cache data corresponding to replaced data or instructions among cache data of the metadata cache for recreation of the metadata.

13. The method according to claim 1, further comprising transmitting the created metadata adapter and the binary data of the application from the server to the mobility device through a piggyback method.

14. A system for installing an application in a mobility device, the system comprising:

the mobility device having at least one device driven by the application; and a server provided to create a metadata adapter for installation of the application in the mobility device, wherein the system is configured to secure data matched to the mobility device in the server based on application installation information included in an application installation request in response to the application installation request received from the mobility device, create a metadata adapter of the application in the server based on the secured matched data, transmit the created metadata adapter together with binary data of the application from the server to the mobility device, and install the application in the mobility device using the metadata adapter transmitted from the server to the mobility device, wherein creating the metadata adapter comprises recreating the metadata adapter by replacing metadata of a before market device of the mobility device with metadata of an after market device provided for the mobility device.

15. The system according to claim 14, wherein creating the metadata adapter is performed through combination of a manifest of the application and a hardware information dictionary of the mobility device.

16. The system according to claim 15, wherein the hardware information dictionary of the mobility device comprises:

unique identification information of the mobility device; and at least one characteristic value of the mobility device associated with the unique identification information.

17. The system according to claim 16, wherein the server, when the mobility device is unidentified, creates the metadata adapter based on a default hardware information dictionary predefined for a mobility device in which hardware information of the mobility device is unidentified.

18. The system according to claim 14, wherein creating the metadata adapter comprises overwriting existing metadata with updated metadata among metadata of the metadata adapter when the metadata of the metadata adapter and metadata already embedded in the mobility device do not match each other.

19. The system according to claim 14, wherein creating the metadata adapter comprises:

storing frequently used data or instructions related to metadata of the metadata adapter in a metadata cache;

invalidating or deleting cache data determined to be unusable among cache data of the metadata cache; and generating new data to update the metadata cache when a request to create a metadata adapter occurs.

20. The system according to claim 19, wherein criteria for determining that the cache data is unusable comprises when a structural change of the mobility device is made.

21. The system according to claim 19, wherein criteria for determining that the cache data is unusable comprises when contents of a maintenance-related database of the mobility device are changed.

22. The system according to claim 19, wherein criteria for determining that the cache data is unusable comprises when a change point occurs in at least one characteristic of the mobility device.

23. The system according to claim 14, wherein conditions for recreating the metadata adapter comprise when a failure occurs in the before market device installed in the mobility device.

24. The system according to claim 14, wherein conditions for recreating the metadata adapter comprise when the before market device installed in the mobility device is replaced with the after market device.

25. The system according to claim 14, wherein the system is further configured to:

store frequently used data or instructions related to metadata of the metadata adapter in a metadata cache; and update, through invalidation or deletion, cache data corresponding to replaced data or instructions among cache data of the metadata cache for recreation of the metadata.

26. The system according to claim 14, wherein the system is further configured to transmit the created metadata adapter and the binary data of the application from the server to the mobility device through a piggyback method.

* * * * *